(12) United States Patent
Olaru (10) Patent No.: US 7,189,071 B2
(45) Date of Patent: Mar. 13, 2007

(54) TELESCOPIC MANIFOLD NOZZLE SEAL (75) Inventor: George Olaru, Toronto (CA)

(73) Assignee: Mold-Masters Limited, Georgetown (CA)

( * ) Notice: Subject to any disclaimer, the term of this patent is extended or adjusted under 35 U.S.C. 154(b) by 367 days.

(21) Appl. No.: 10/775,154

(22) Filed: Feb. 11, 2004

(65) Prior Publication Data

US 2004/0156944 A1    Aug. 12, 2004

Related U.S. Application Data

(60) Provisional application No. 60/446,698, filed on Feb. 12, 2003.

(51) Int. Cl.
*B29C 45/00* (2006.01)

(52) U.S. Cl. .............. 425/563; 425/562; 425/564; 425/565; 425/566; 425/549; 425/572

(58) Field of Classification Search ........ 425/562, 425/563, 564, 565, 566, 549, 572
See application file for complete search history.

(56) References Cited

U.S. PATENT DOCUMENTS

| | | | |
|---|---|---|---|
| 3,491,408 A | 1/1970 | Natkins | |
| 3,535,742 A | 10/1970 | Marcus | |
| 3,812,228 A | 5/1974 | Skoroszewski | |
| 3,822,856 A | 7/1974 | Gellert | |
| 4,013,393 A | 3/1977 | Gellert | |
| 4,330,258 A | 5/1982 | Gellert | |
| 4,433,969 A | 2/1984 | Gellert | |
| 4,468,191 A | 8/1984 | Gellert | |
| 4,588,367 A | 5/1986 | Schad | |
| 4,682,754 A | 7/1987 | Schad | |
| 4,682,945 A * | 7/1987 | Schad | 425/549 |
| 4,818,217 A | 4/1989 | Schmidt et al. | |
| 4,902,218 A | 2/1990 | Leonard et al. | |
| 5,004,416 A | 4/1991 | Van Den Brink | |
| 5,032,078 A | 7/1991 | Benenati | |
| 5,049,062 A * | 9/1991 | Gellert | 425/549 |
| 5,125,827 A | 6/1992 | Gellert | |
| 5,478,230 A | 12/1995 | McGrevy | |
| 5,499,916 A | 3/1996 | Schad et al. | |
| 5,518,393 A | 5/1996 | Gessner | |
| 5,609,893 A | 3/1997 | Eastwood | |
| 5,759,595 A | 6/1998 | Gunther | |
| 5,851,571 A | 12/1998 | Manner | |
| 5,853,776 A | 12/1998 | Meijer | |
| 5,896,640 A | 4/1999 | Lazinski et al. | |
| 6,062,846 A | 5/2000 | Kalemba | |
| 6,261,084 B1 | 7/2001 | Schmidt | |

(Continued)

FOREIGN PATENT DOCUMENTS

CA    1153523 A    9/1983

(Continued)

*Primary Examiner*—Joseph S. Del Sole
*Assistant Examiner*—Maria Veronica Ewald
(74) *Attorney, Agent, or Firm*—Medler Ferro PLLC (57) ABSTRACT

An injection molding apparatus including a manifold having a manifold melt channel, a nozzle having a nozzle melt channel, a slidable seal having seal melt channel located between the nozzle and the manifold melt channels, and a biasing element that provides sealing contact between the slidable seal and the manifold and nozzle to maintain a sealed melt path through the manifold, seal and nozzle melt channels.

19 Claims, 6 Drawing Sheets

U.S. PATENT DOCUMENTS

| | | | |
|---|---|---|---|
| 6,309,207 B1 | 10/2001 | Kalemba | |
| 6,388,542 B2 * | 4/2002 | Steil et al. | 264/328.14 |
| 6,669,462 B1 | 12/2003 | Jenko | |
| 6,860,732 B2 | 3/2005 | Babin et al. | |
| 2001/0011415 A1 | 8/2001 | Kalemba | |
| 2001/0022321 A1 | 9/2001 | Bouti | |
| 2003/0075563 A1 | 4/2003 | Bazzo et al. | |

FOREIGN PATENT DOCUMENTS

| | | |
|---|---|---|
| DE | 19601102 | 7/1997 |
| DE | 100 08 722 A1 | 8/2001 |
| EP | 0 443 387 A1 | 8/1991 |
| EP | 0 841 141 A1 | 5/1998 |
| EP | 1 053 852 A1 | 11/2000 |
| EP | 1 188 537 A2 | 3/2002 |
| EP | 1 300 232 A | 4/2003 |
| EP | 1 101 550 B1 | 1/2005 |
| JP | 4-067923 A | 3/1992 |
| JP | 10-166393 A | 6/1998 |
| WO | WO 96/21548 A1 | 7/1996 |
| WO | WO 01/81066 A1 | 11/2001 |
| WO | WO 01/87570 A1 | 11/2001 |

* cited by examiner

TELESCOPIC MANIFOLD NOZZLE SEAL

CROSS-REFERENCE TO RELATED APPLICATIONS

This application claims the benefit of provisional application 60/446,698, filed Feb. 12, 2003, which is herein incorporated by reference in its entirety.

BACKGROUND OF THE INVENTION

1. Field of the Invention

The present invention relates generally to an injection molding apparatus and, in particular, to an improved seal located between a manifold and a nozzle.

2. Background Art

A common problem associated with hot runner injection molding systems is the leaking of molten plastic that can occur between the manifold and the nozzle. Leaking is typically caused by operation of the hot runner injection molding system outside of the designated operating window. There are many different nozzle designs that have attempted to stop leakage from occurring.

For example, in one design, a pair of spacers located between a manifold and a cover plate or a hot runner plate, such as disclosed in U.S. Pat. Nos. 6,309,207, 6,062,846 and U.S. patent application Publication No. 2001/0011415, apply a contact pressure between the nozzle body and the manifold to achieve a seal therebetween. The spacers are arranged in series with a first spacer abutting the manifold and a second spacer abutting the cover plate. The second spacer has a different response characteristic to compressive pressures than the first spacer.

WO 01/87570 A1 (U.S. Pat. No. 6,669,462) discloses a non-flat sealing interface, which is provided between a nozzle and a manifold. A spring urges the nozzle against the manifold to produce a pressure distribution with a peak sealing pressure that occurs adjacent the nozzle and manifold melt channels. Similarly, U.S. Pat. No. 5,896,640 discloses a sealing insert that abuts a nozzle shoulder. The sealing insert generates an angular sealing force and maintains sealing contact between the nozzle and manifold channels. The sealing insert produces a peak sealing pressure that occurs adjacent the nozzle and manifold channels.

Despite the existence of previous designs, there remains a need for a manifold to nozzle seal that has improved reliability and cost effectiveness.

SUMMARY OF THE INVENTION

According to one aspect of the invention, there is provided an injection molding apparatus that includes a manifold member having a manifold melt channel for delivering a melt stream of moldable material through an outlet thereof, a nozzle member having a nozzle melt channel for delivering the melt stream to a mold cavity, and a seal located at an interface between the manifold member and the nozzle member. The seal includes a seal melt channel communicating at a first end with the manifold melt channel and at a second end with the nozzle melt channel for receiving the melt stream from the manifold melt channel and delivering the melt stream to the nozzle melt channel. The seal is movable relative to one of the manifold member and the nozzle member such that a portion of the seal melt channel is maintained in fluid communication with a portion of the melt channel of the member that the seal is movable relative to. A biasing element biases the seal against the other of the manifold and nozzle members to maintain a sealing pressure therebetween.

According to another aspect of the invention, there is provided an injection molding apparatus including a manifold having a manifold melt channel, a nozzle having a nozzle melt channel, a slidable seal having seal melt channel located between the nozzle and the manifold melt channels, and a biasing element. The biasing element provides sealing contact between the slidable seal and the manifold and nozzle to maintain a sealed melt path through the manifold, seal and nozzle melt channels.

According to another aspect of the invention, there is provided a method of sealing a melt path between a manifold having a manifold melt channel and a nozzle having a nozzle melt channel of an injection molding apparatus. The method includes: providing a seal between the manifold and nozzle, at least a portion of the seal being movable in an axis parallel to a melt path flow direction through the nozzle melt channel, and having a seal melt channel in communication with each of the nozzle melt channel and the manifold melt channel; and providing a biasing element to generate a sealing pressure between cooperating surfaces around the melt channels of the seal and at least one of the manifold and nozzle.

Other aspects and features of the present invention will become apparent to those ordinarily skilled in the art upon review of the following description of specific embodiments of the invention in conjunction with the accompanying Figures.

BRIEF DESCRIPTION OF THE FIGURES

Embodiments of the present invention will now be described more fully with reference to the accompanying drawings in which like reference numerals represent like parts.

DETAILED DESCRIPTION OF THE INVENTION

Figure 1:
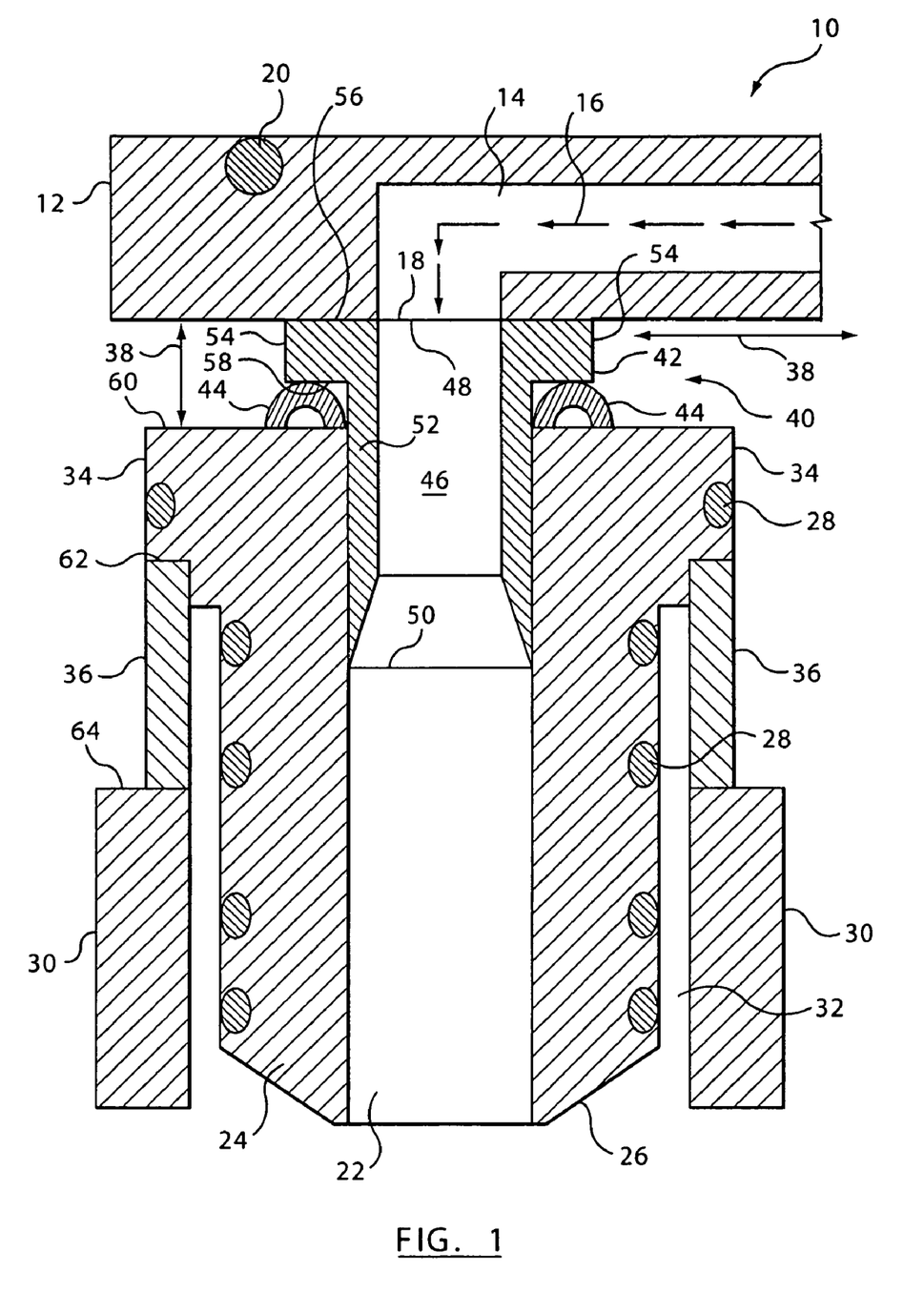
FIG. 1 is a sectional view of a portion of an injection molding system showing a sealing system according to an embodiment of the invention.

FIG. 1 shows, indicated generally by reference 10, a portion of an injection molding apparatus. Injection molding apparatus 10 includes a manifold 12 through which a manifold melt channel 14 passes. Manifold melt channel 14 is a conduit for a melt stream of moldable material that flows through manifold melt channel 14 in the direction indicated by arrows 16 and exits manifold melt channel 14 at a channel outlet 18. Manifold heaters 20 are provided in manifold 12 to maintain the melt stream at a desired temperature.

A nozzle 24 is located between manifold 12 and a mold cavity (not shown). Nozzle 24 includes a nozzle melt channel 22 for receiving the melt stream from manifold melt channel 14 and delivering it to the mold cavity, typically through a mold gate (not shown) that is located adjacent a tip 26 of nozzle 24. Nozzle 24 is provided with a heater 28 for maintaining a desired melt stream heat profile as the melt stream passes through nozzle channel 22. Heater 28 could take a number of different configurations, including for example, a helical heating wire provided near or at an outer surface of nozzle 24, as shown in FIG. 1. Although only a single nozzle is shown in FIG. 1, the injection molding system 10 will typically include a plurality of such nozzles.

Nozzle 24 is received within a nozzle cavity 32 in a cavity plate 30. The outer surface of nozzle 24 will generally be spaced apart from the inner surface of nozzle cavity 32. In the illustrated embodiment, nozzle 24 includes an enlarged head portion 34 from which a flange or spacer element 36 extends to support nozzle 24 on cavity plate 30.

During operation of injection molding apparatus 10, relative vertical, and in some applications lateral, movement of nozzle 24 and manifold 12 can occur, as indicated by arrows 38 due to thermal expansion of the components. The present invention provides a seal arrangement, indicated generally by 40, for preventing or reducing leakage of the melt stream that may otherwise occur at the transition between manifold 12 and nozzle 24. Seal arrangement 40 includes a cooperating seal 42 and a biasing element 44. Seal 42 is telescopically mounted to nozzle 24 and includes a tubular wall 52 that defines a seal melt channel 46 with an inlet 48 that communicates with manifold channel melt 14 for receiving the melt stream from the manifold channel, and an outlet 50 that communicates with nozzle channel 22 for delivering the melt stream into nozzle channel 22. A portion of tubular wall 52 is slidably received within and movable relative to an upper portion of nozzle channel 22. The outer surface of tubular wall 52 overlaps and cooperates sufficiently tightly with the inner surface of nozzle channel 22 that back flow leakage of the melt stream is impeded. As indicated in FIG. 1, seal melt channel 46 may taper outwards in the vicinity of outlet 50.

Seal 42 includes an enlarged upper end that in the illustrated embodiment is a cylindrical ring 54 through which seal channel 46 passes and that extends radially outward from an upper end of tubular wall 52. Cylindrical ring 54 has a planar upper surface 56 that surrounds seal inlet 48 and which sealably engages a planar bottom surface of manifold 12 that surrounds outlet 18. Cylindrical ring 54 also has a lower planar surface 58 that surrounds tubular wall 52 and is in spaced opposition to an upper surface 60 of head portion 34 of nozzle 24. As used herein directional orientation terms such as "upper" and "lower" are used for explanatory purposes only, as the components in use may have other directional orientations.

Biasing element 44 shown in FIG. 1 is a spring or deflection ring that is located between opposed surfaces 58 and 60 and has an inverted "U" shaped arcuate cross-section. Biasing element 44 pushes downwards on nozzle 24, and also biases cylindrical ring 54 of seal 42 against manifold 12, providing a sealing force at the interface between seal 42 and manifold 12. Biasing element 44 is preferably pre-loaded so that the sealing force is provided both when the injection molding system is cold as well as when it is hot. Biasing element 44 can be made of various materials or material combinations as is suitable for the particular molding conditions. In one embodiment, biasing element 44 is made of a high thermally conductive material such as high strength steel, although other resilient metals and materials could be used. Biasing element 44 could have a number of alternative configurations and cross-sections. For example, it could have, among other configurations, a side-ways "V" shaped cross-section, a "C" shaped cross-section or an "O" shaped cross-section.

As noted above, nozzle 24 includes enlarged head portion 34 from which spacer element 36 extends to support nozzle 24 relative to cavity plate 30. In one embodiment, spacer element 36 is a tubular wall that is separately formed from nozzle 24 and has opposite facing bearing ends, one of which engages an annular shoulder 62 provided around the bottom of enlarged head portion 34, and the other of which engages an annular shoulder 64 that is provided on cavity plate 30. Spacer element 36 is made from a material that has a different thermal conductivity than the material of nozzle 24. In some molding applications, spacer element 36 may be a material such as titanium, titanium alloy, or ceramic, having a lower thermal conductivity than nozzle 24, which is typically made from a tool steel such as H13 or P20 steel, for example. In some molding applications, spacer element 36 could be made from a material having a higher thermal conductivity, such as copper, beryllium copper, brass or some steels, than nozzle 24. The material selected for spacer element 36 will depend on the particular molding application.

During operation of injection molding apparatus 10, seal 42 moves relative to nozzle 24, with tubular wall 52 of seal 42 telescoping in and out of nozzle 24 as the relative locations of manifold 12 and nozzle 24 vary due to thermal expansion and contraction of the various components of apparatus 10. Biasing element 44 applies force to the upper end of seal 42, such that a sealing force is maintained between the upper surface of cylindrical ring 54 and the lower surface of manifold 12. Biasing element 44 is configured to resiliently deform without damage resulting to the injection mold system components, while maintaining an appropriate sealing force. The thermal conductivity of spacer element 36 is selected to compliment the operation of seal arrangement 40. For example, if biasing element 44 is pre-loaded to provide a sealing force during a cold start, then the use of spacer element 36 having a relatively low thermal conductivity compared to nozzle 24 may be desired such that the increased pressure applied to biasing element 44 as nozzle 24 heats up is less than what it would be if spacer element 36 were made of a material having the same or higher thermal conductivity than the nozzle 24. In some embodiments spacer element 36 may be integrally formed with and/or from the same material as nozzle 24.

Figure 2:
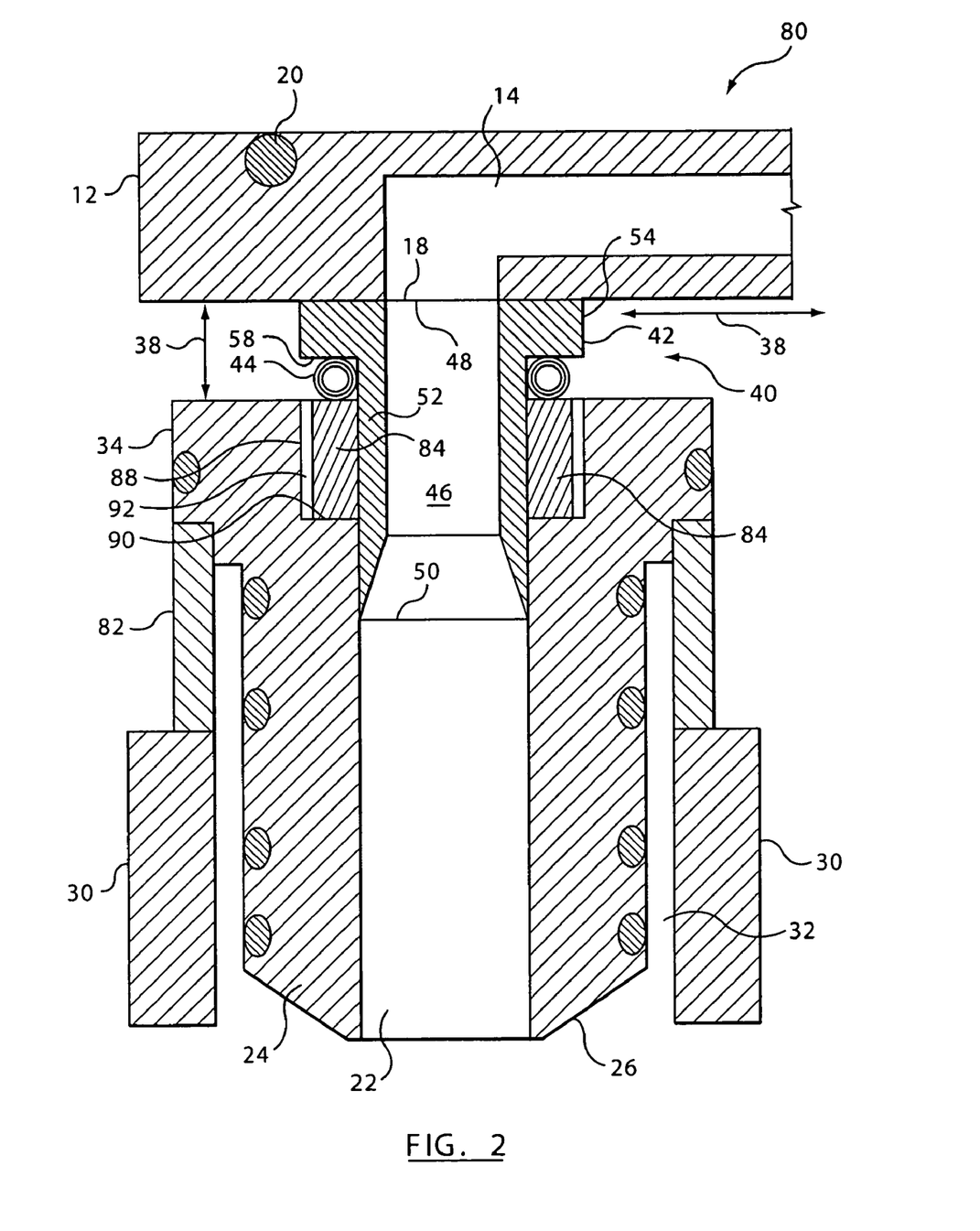
FIG. 2 is a sectional view of a portion of an injection molding system showing a sealing system according to a further embodiment of the invention.

FIG. 2 shows a further embodiment of an injection molding apparatus 80, which is similar in configuration and operation to injection molding apparatus 10 subject to the differences that will be apparent from the Figures and this description. Similar to injection molding apparatus 10, apparatus 80 includes deflection or spring biasing element 44 for biasing seal 42 against manifold 12. As shown in FIG. 2, biasing element 44 is an annular ring with an "O" shaped cross-section, but could be any number of spring configurations. Unlike the injection molding apparatus 10, nozzle 24 of apparatus 80 includes an annular spacer element 82 that is integrally formed with and of the same materials as head portion 34 of nozzle 24, rather than being a separately formed element having a different thermal conductivity. Nozzle 24 of apparatus 80 includes an annular slot or recess 88 provided in the head portion 34 around an upper end of nozzle channel 22. A tubular biasing element 84 that surrounds a portion of tubular wall 52 of seal 42 is received in slot 88. Tubular biasing element 84 includes bearing surfaces at its opposite ends, with one end bearing against biasing element 44, and the opposite end bearing against an annular support shoulder 90 provided at the end of slot 88. Tubular biasing element 84 may have a smaller outer circumference than the circumference defined by slot 88, providing a space 92 between the walls of tubular biasing element 84 and slot 88 that are parallel to the melt flow direction, allowing for some relative lateral movement during operation of apparatus 80.

Tubular biasing element 84 is in some embodiments made of a material having a different thermal conductivity than the material of nozzle 24. In some molding applications, tubular biasing element 84 may be from a material such as titanium, titanium alloy, or ceramic, having a lower thermal conductivity than nozzle 24. In some molding applications, tubular biasing element 84 could be made from a material having a higher thermal conductivity, such as copper, beryllium copper, brass or some steels, than nozzle 24. The material selected for tubular biasing element 84 will depend on the particular molding application.

During operation, tubular biasing element 84 and biasing element 44 act in serial cooperation to bias cylindrical ring 54 of seal 42 against manifold 12 with a sealing pressure from cold start through to normal operating temperatures. Tubular biasing element 84 and biasing element 44 each have different thermal and pressure response characteristics, allowing selection of a combination that permits a seal between manifold 12 and cylindrical ring 54 of seal 42 to be maintained across a range of pressure and temperature conditions. Generally, tubular biasing element 84 will be substantially relatively unaffected by changes in pressure, and will be of a material having a thermal conductivity less than the material of nozzle 24 so as to mitigate the range of pressures that biasing element 44 is subjected to during operation of apparatus 80.

Although not shown in the Figures, as known in the art manifold 12 may be a floating manifold in which a spacing element located on a side of the manifold opposite nozzle 24 applies a biasing force on manifold 12 towards nozzle 24, as shown for example in U.S. Pat. No. 5,125,827, which is herein incorporated by reference in its entirety.

Although in the illustrated and described embodiments seal 42 is sealably pressured against manifold 12 and telescopically mounted relative to nozzle 24, in some embodiments the configuration could be inverted with the seal telescopically mounted for movement relative to the manifold, and sealably pressured against nozzle 24.

Figure 3:
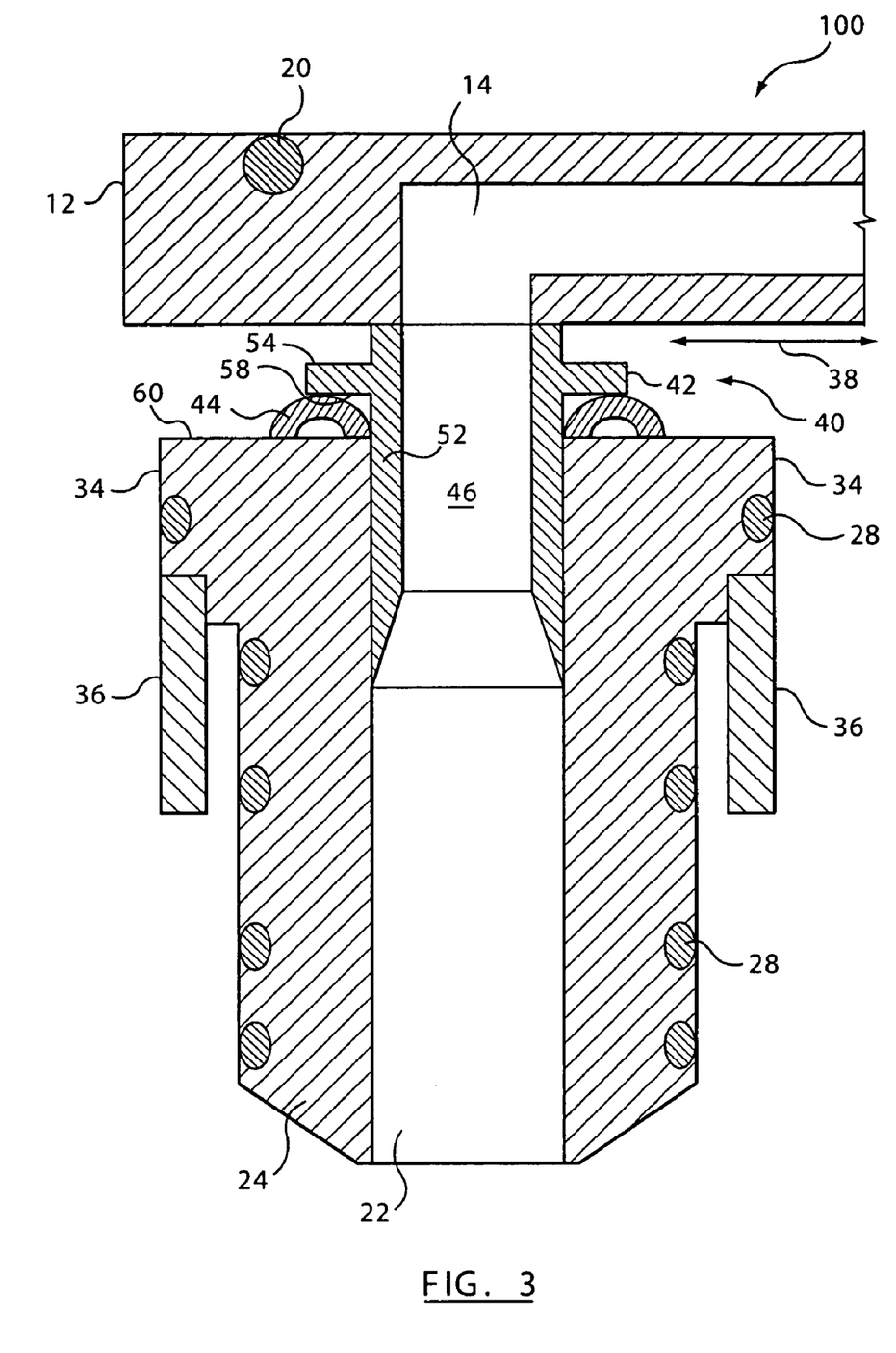
FIG. 3 is a sectional view of a portion of an injection molding system showing a sealing system according to another embodiment of the invention.
Figure 4:
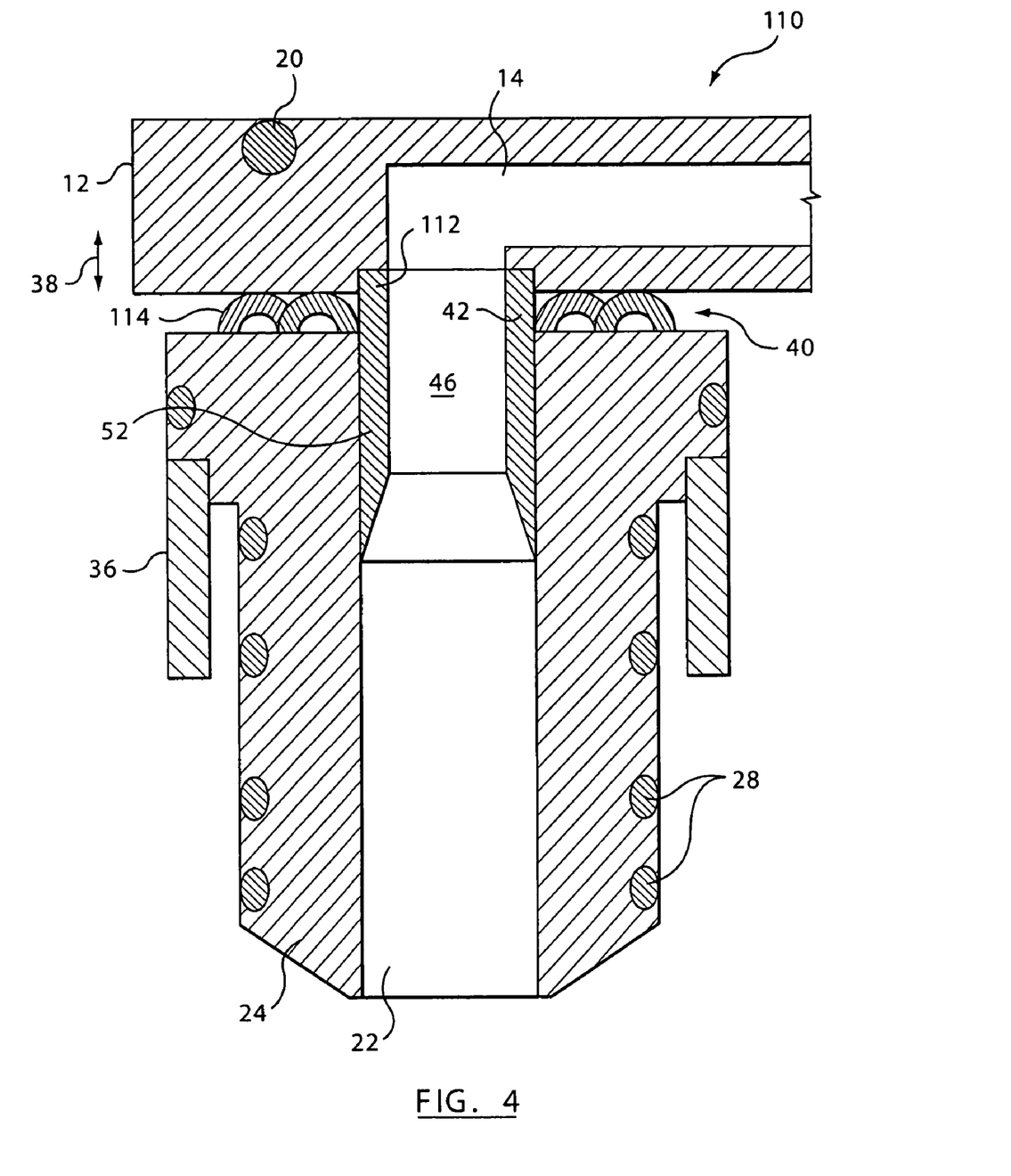
FIG. 4 is a sectional view of a portion of an injection molding system showing a sealing system according to another embodiment of the invention.

FIGS. 3 and 4 show injection molding apparatus, indicated generally by 100 and 110, according to further embodiments of the invention. Referring to FIG. 3, injection molding apparatus 100 is similar in configuration and operation to injection molding apparatus 10 subject to the differences that will be apparent from the Figures and this description. In seal arrangement 40 of apparatus 100, tubular wall 52 of seal 42 extends beyond an upper surface of annular ring 54 to engage manifold 12. In some embodiments, especially in smaller injection manifold configurations where lateral movement of the manifold to the seal is negligible, the upper end of tubular wall 52 could be received within a corresponding annular slot provided in manifold 12.

FIG. 4 shows an injection molding apparatus 110 that is similar in configuration and operation to injection molding apparatus 10 subject to the differences that will be apparent from the Figures and this description. In injection molding apparatus 110, seal arrangement 40 is a one piece, integrally formed spring bias element 114 and seal 42. An upper end 112 of the tubular wall 52 is received within an annular slot provided in manifold 12, such that an upper end of seal melt channel 46 overlaps with an outlet portion of manifold melt channel 14. Spring bias element 114 as illustrated has a plurality of integrally connected concentric rings, each having a "U" or "C" shaped cross-section. However, a number of different bias element configurations could be used, including, for example, concentric rings having "V" shaped cross-sections, such as is shown in U.S. Pat. No. 5,125,827. In apparatus 110, spring bias element 114 bears directly on both manifold 12 and nozzle 24. In use, spring bias element 114 deforms to allow tubular wall 52 to move relative to nozzle 24 to compensate for changes in relative vertical locations of manifold 12 and nozzle 24.

Figure 5:
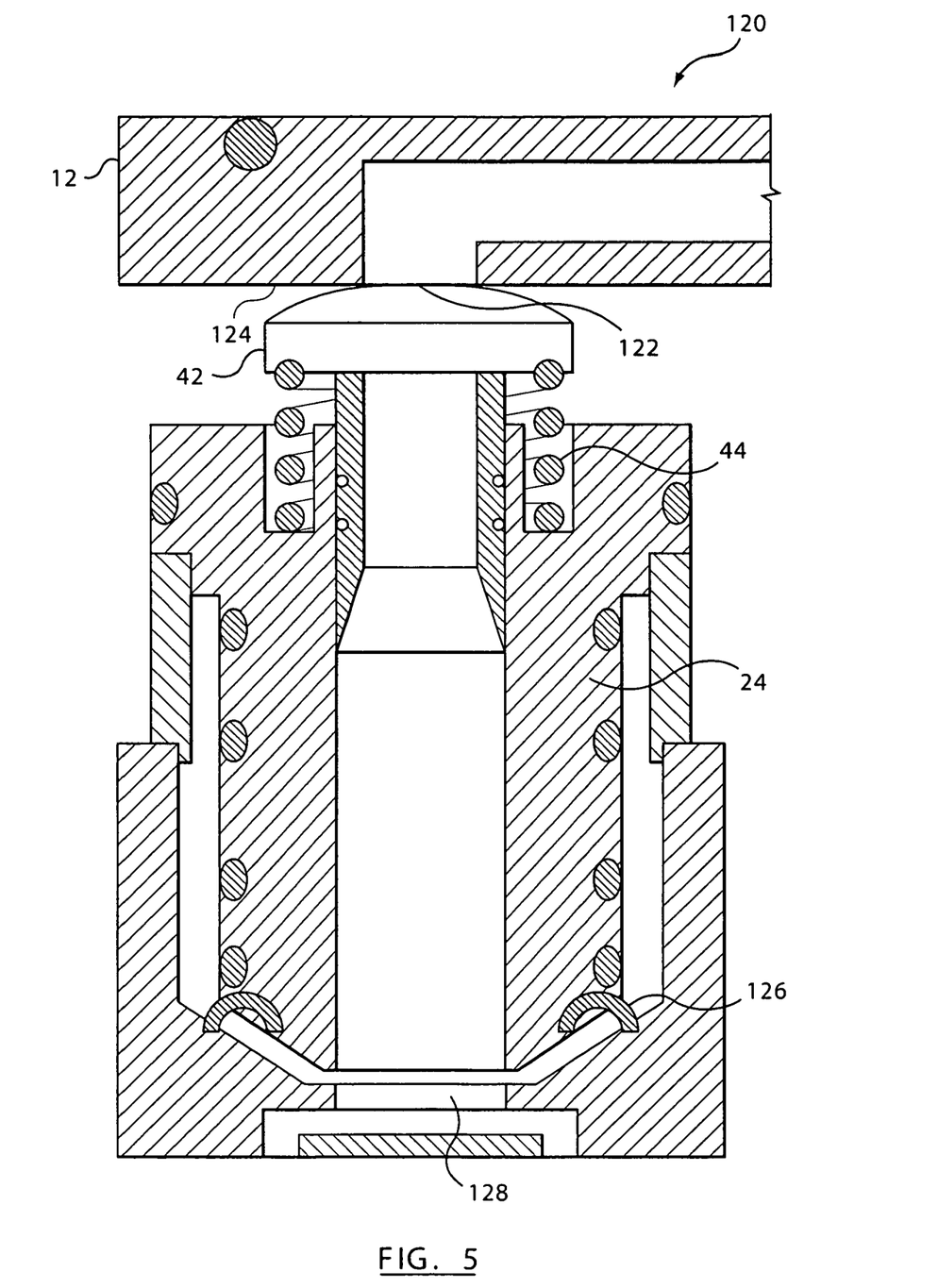
FIG. 5 is a sectional view of a portion of an injection molding system showing a sealing system according to another embodiment of the invention.

FIG. 5 shows another embodiment of an injection molding apparatus 120, which is similar in configuration and operation to injection molding apparatus 10 subject to the differences that will be apparent from FIG. 5 and this description. Similar to injection molding apparatus 10, apparatus 120 includes deflection or spring biasing element 44 for biasing seal 42 against manifold 12. Biasing spring 44 may be any number of spring configurations as described above.

Unlike the injection molding apparatus 10, biasing seal 42 of apparatus 120 has a non-flat or a non-planar upper surface 122. More particularly, upper surface 122 contains a spherical or a dome-like profile of a certain radius. In a further embodiment, upper surface 122 may have a conical profile. In the embodiment of the present invention shown in FIG. 5, manifold 12 is shown in cold conditions to have a lower planar surface 124 that makes contact with upper surface 122 of biasing seal 42. However, the non-flat upper surface 122 of biasing seal 42 also provides advantages when the entire manifold 12 bends under certain critical injection molding operating conditions of high temperature and pressure. Under such molding conditions, the required sealing force may vary between each of the plurality of nozzles 24 that are fluidly connected to the manifold because the manifold may develop a slightly convex and/or concave lower surface under the high temperature and pressure operating conditions. Thus, a different required sealing force may be required for each of the nozzles 24 in order to keep each of them in sealing contact with manifold 12 which is further accommodated by the non-planar upper surface 122 of biasing seal 42.

Figure 6:
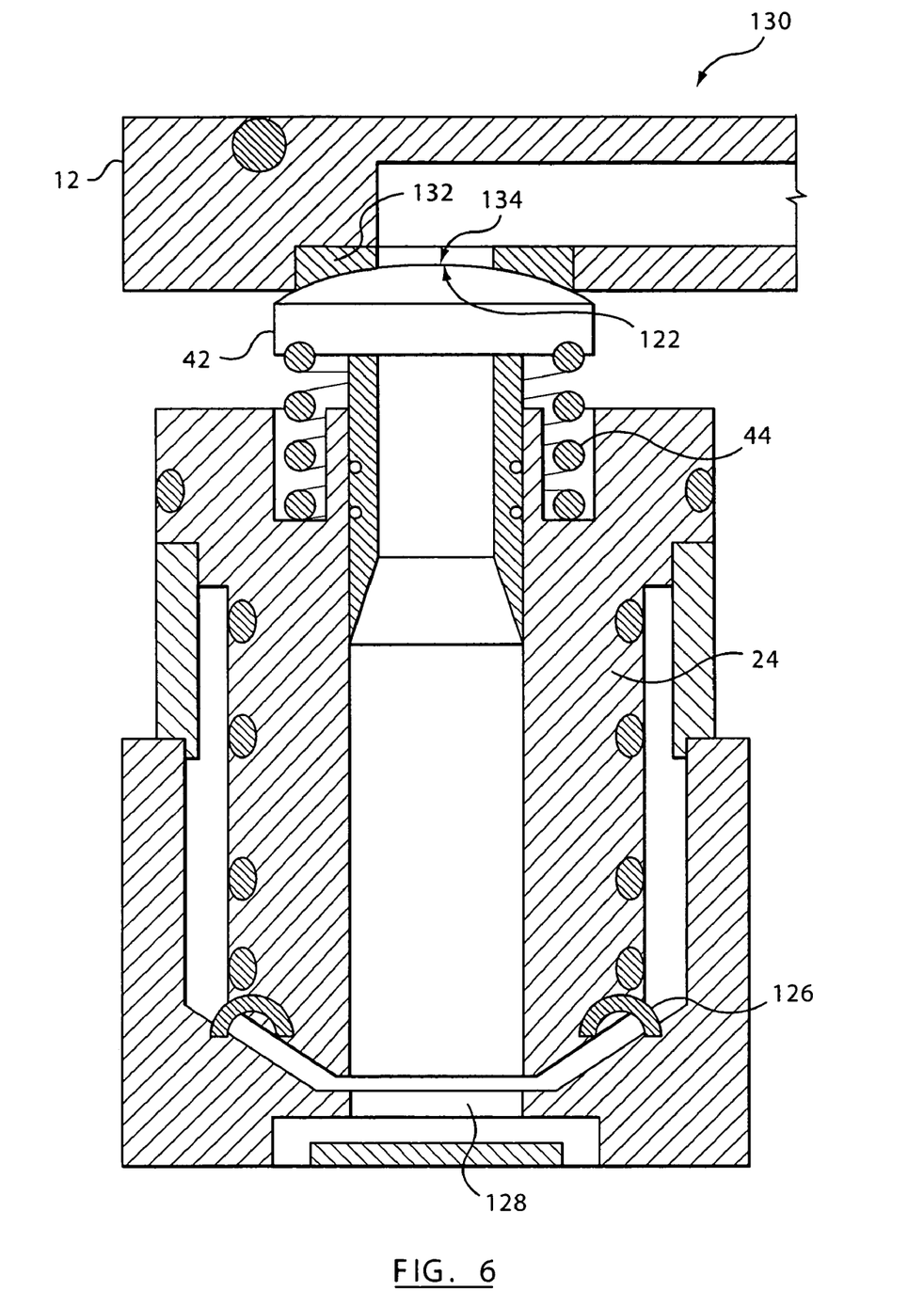
FIG. 6 is a sectional view of a portion of an injection molding system showing a sealing system according to another embodiment of the invention.

Further, apparatus 120 may contain a nozzle gate seal 126, shown in FIGS. 5 and 6, that limits the thermal expansion of nozzle 24 towards a mold gate 128. Nozzle gate seal 126 also provides an additional biasing element for the entire nozzle 24.

FIG. 6 shows another embodiment of an injection molding apparatus 130, which is similar in configuration and operation to injection molding apparatus 10 subject to the differences that will be apparent from FIG. 6 and this description. Similar to injection molding apparatus 10, apparatus 130 includes deflection or spring biasing element 44 for biasing seal 42 against manifold 12. Biasing spring 44 may be any number of spring configurations as described above. Unlike the injection molding apparatus 10, manifold 12 includes a manifold seal insert 132 located at each of the exits of the manifold melt channels at the interface with biasing seal 42 of each nozzle 24. Further, as described in connection with FIG. 5, biasing seal 42 of apparatus 130 has non-flat or non-planar upper surface 122. More particularly, upper surface 122 contains a spherical or a dome profile of a certain radius. Upper surface 122 may also have a conical profile. Manifold seal insert 132 has a lower non-flat or non-planar surface 134 that correspondingly engages upper surface 122 of biasing seal 42.

With all injection molding systems described herein, the sealing force is provided by spring biasing element 44 which acts upon biasing seal 42 in both cold and hot conditions. Spring biasing element 44 keeps biasing seal 42 in permanent contact with manifold 12 through a wide range of operating conditions, including both cold or hot temperature conditions. Further, spring biasing element 44 prevents local leakage for each nozzle 24 that, due to the bending of manifold 12, may have a wider gap at the interface with manifold 12. Further, when a nozzle 24 has a wide gap at the interface with manifold 12, upper surface 122 of biasing seal 42 described in connection with FIGS. 5 and 6 and manifold seal insert 132 described in connection with FIG. 6 provide additional security against leakage.

With all injection molding systems described herein, the sealing force provided by spring biasing element 44 acts only upon biasing seal 42 rather than the entire nozzle 24. Only the biasing seal 42 is biased against manifold 12 because biasing seal 42 is telescopic within nozzle melt channel 22 and therefore freely slides in the longitudinal direction with changing operating conditions.

As will be apparent to those skilled in the art in light of the foregoing disclosure, many alterations and modifications are possible in the practice of this invention without departing from the claimed scope thereof. Accordingly, the scope of the invention is to be construed in accordance with the substance defined by the following claims.

What is claimed is:

1. An injection molding apparatus comprising:
    a manifold member having a manifold melt channel for delivering a melt stream of moldable material through an outlet thereof;
    a nozzle member having a nozzle melt channel for delivering the melt stream to a mold cavity;
    a seal located at an interface between the manifold member and the nozzle member, the seal having a seal melt channel communicating at a first end with the manifold melt channel and at a second end with the nozzle melt channel for receiving the melt stream from the manifold melt channel and delivering the melt stream to the nozzle melt channel; and
    a biasing element in contact with the nozzle member and the seal to maintain a continuous sealing pressure between the manifold member and the seal independent of injection pressure.

2. The injection molding apparatus of claim 1, wherein the seal and biasing element are separately formed.

3. The injection molding apparatus of claim 1, wherein the seal and biasing element are integrally connected.

4. The apparatus of claim 1, wherein the seal is telescopically connected to the nozzle member.

5. The apparatus of claim 1 including, first and second biasing elements cooperating for biasing the seal against the other of the manifold and nozzle members, the first and second biasing elements having different pressure response characteristics.

6. The apparatus of claim 1, wherein the biasing element includes a spring element.

7. The apparatus of claim 4, wherein the spring element is preloaded to apply the sealing pressure at a start-up temperature of the apparatus.

8. The apparatus of claim 1, wherein the seal is movable relative to one of the manifold member and the nozzle member.

9. The apparatus of claim 1, wherein said seal includes a tubular wall extending from a cylindrical ring, said tubular wall being at least partly received in said nozzle melt channel.

10. The apparatus of claim 9, wherein said biasing element is located between an upper surface of a nozzle head of said nozzle member and said cylindrical ring of said seal.

11. The apparatus of claim 1, wherein the seal has a non-flat upper surface.

12. The apparatus of claim 11, wherein the manifold member further comprises a manifold seal insert that has a non-flat surface that engages the non-flat upper surface of the seal.

13. An injection molding apparatus comprising:
    a manifold having a manifold melt channel for receiving a melt stream of moldable material;
    a nozzle having a nozzle melt channel;
    a seal having a seal melt channel located between the nozzle melt channel and the manifold melt channel for delivering melt from said manifold melt channel to said nozzle melt channel; and
    a biasing element positioned between said nozzle and said seal that continuously biases said seal against said manifold to provide sealing contact between said seal and said manifold to maintain a sealed melt path between said manifold melt channel and said nozzle melt channel.

14. The apparatus of claim 13, wherein said seal is slidable relative to said manifold and said nozzle.

15. The apparatus of claim 14, wherein said seal telescopes within said nozzle melt channel.

16. An injection molding apparatus comprising:
    a manifold having a manifold melt channel for receiving a melt stream of moldable material;
    a nozzle having a nozzle melt channel and a nozzle head portion;
    a seal having a seal melt channel located between the nozzle melt channel and the manifold melt channel; and
    a biasing element that makes a first contact with the nozzle head portion and a second contact with the seal to provide a sealing force between the seal and the manifold.

17. The injection molding apparatus of claim 16, wherein the seal includes a tubular wall extending from an annular ring and the second contact of the biasing element is with a surface of the annular ring.

18. The injection molding apparatus of claim 17, wherein the tubular wall of the seal telescopes within the nozzle melt channel.

19. An injection molding apparatus comprising:
    a manifold having a manifold melt channel for receiving a melt stream of moldable material, the manifold melt channel having an outlet positioned within an annular slot in the manifold;
    a nozzle having a nozzle melt channel for receiving the melt stream from the manifold melt channel; and
    a seal including an annular sealing portion having an integral biasing element radially extending therefrom, the biasing element being positioned between the nozzle and the manifold such that an upper end of the annular sealing portion is received within the manifold annular slot and a lower end of the annular sealing portion is slidable within the nozzle melt channel to position a seal melt channel between the manifold channel outlet and the nozzle melt channel, and wherein the biasing element deforms to accommodate movement of the annular sealing portion relative to the nozzle and the manifold.

* * * * *